US010160121B2

(12) United States Patent
Lee et al.

(10) Patent No.: US 10,160,121 B2
(45) Date of Patent: Dec. 25, 2018

(54) MODULE CONNECTION SYSTEM

(71) Applicant: KOREA INSTITUTE OF SCIENCE AND TECHNOLOGY, Seoul (KR)

(72) Inventors: Woosub Lee, Seoul (KR); Seong Hun Hong, Seoul (KR); Dong Eun Choi, Seoul (KR); Sung Chul Kang, Seoul (KR); Jeong-Jung Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/658,394

(22) Filed: Jul. 25, 2017

(65) Prior Publication Data
US 2018/0333867 A1 Nov. 22, 2018

(30) Foreign Application Priority Data

May 17, 2017 (KR) .................... 10-2017-0061205

(51) Int. Cl.
*H01R 24/84* (2011.01)
*B25J 19/00* (2006.01)
(Continued)

(52) U.S. Cl.
CPC .......... *B25J 19/0029* (2013.01); *H01R 24/84* (2013.01); *H01R 27/00* (2013.01); *H01R 2107/00* (2013.01)

(58) Field of Classification Search
CPC .. H01R 13/42; H01R 13/518; H01R 13/6315; H01R 13/6599; H01R 31/06;
(Continued)

(56) References Cited

U.S. PATENT DOCUMENTS 5,244,406 A * 9/1993 Vranish ................. B64G 1/641
439/362
6,605,914 B2 8/2003 Yim et al.
(Continued)

FOREIGN PATENT DOCUMENTS

JP 929671 A 2/1997
JP 200379961 A 3/2003
(Continued)

OTHER PUBLICATIONS

Lyder et al., "Genderless Connection Mechanism for Modular Robots Introducing Torque Transmission Between Modules", ICRA 2010 Workshop, Modular Robots: State of the Art, May 3, 2010, pp. 77-81, Alaska, AK, USA.
(Continued)

*Primary Examiner* — Truc Nguyen
(74) *Attorney, Agent, or Firm* — Cantor Colburn LLP

(57) ABSTRACT

A module connection system is configured by connecting a plurality of modules by means of connectors. The modules include a base module, a first module and a second module, and the connectors include a first connector and a second connector. The base module transmits power and signals provided from a driving source, the first module is electrically/mechanically connected to the base module by means of the first connector, and the second module is electrically/mechanically connected to the first module by means of the second connector. The first connector includes a larger number of connection terminals in comparison to the second connector in order to transmit power and signals from the base module to the second module and simultaneously supply power and signals required for the first module.

11 Claims, 14 Drawing Sheets

(51) Int. Cl.
*H01R 27/00* (2006.01)
*H01R 107/00* (2006.01)

(58) Field of Classification Search
CPC .... H01R 13/62; H01R 13/665; H01R 13/713; H01R 2201/04; H01R 2201/26; H01R 27/02; H01R 43/26
See application file for complete search history.

(56) References Cited

U.S. PATENT DOCUMENTS

| | | | | |
|---|---|---|---|---|
| 7,438,482 | B2* | 10/2008 | Asari | G02B 6/43 385/89 |
| 7,762,825 | B2* | 7/2010 | Burbank | B25J 19/0029 439/247 |
| 8,585,420 | B2* | 11/2013 | Burbank | C01B 3/36 439/247 |
| 8,992,113 | B2 | 3/2015 | Campagna et al. | |
| 9,456,909 | B2 | 10/2016 | Johnson et al. | |
| 9,475,199 | B2 | 10/2016 | Burridge et al. | |
| 2010/0267270 | A1* | 10/2010 | Jehmlich | H01R 13/42 439/357 |
| 2013/0260606 | A1* | 10/2013 | Hahakura | H01R 13/60 439/534 |
| 2013/0340560 | A1 | 12/2013 | Burridge et al. | |

FOREIGN PATENT DOCUMENTS

| | | |
|---|---|---|
| KR | 10-1280237 B1 | 7/2013 |
| KR | 1020150127292 A | 11/2015 |
| WO | 2014146085 A1 | 9/2014 |

OTHER PUBLICATIONS

Parrott et al., "HiGen: A High-Speed Genderless Mechanical Connection Mechanism with Single-Sided Disconnect for Self-Reconfigurable Modular Robots", 2014 IEEE/RSJ International Conference on Intelligent Robots and Systems, Sep. 14-18, 2014, pp. 3926-3932, Chicago, IL, USA.

* cited by examiner

MODULE CONNECTION SYSTEM

CROSS-REFERENCE TO RELATED APPLICATION

This application claims priority to Korean Patent Application No. 10-2017-0061205, filed on May 17, 2017, and all the benefits accruing therefrom under 35 U.S.C. § 119, the contents of which in its entirety are herein incorporated by reference.

BACKGROUND

1. Field

The present disclosure relates to a module connection system, and more particularly, to a module connection system in which a plurality of modules may be connected to each other by connectors and used.

[Description about National Research and Development Support]

This study was supported by the Robot Industry Fusion Core Technology Development project of Ministry of Trade, Industry and Energy, Republic of Korea (Project No. 1415141566) under the superintendence of Korea Evaluation Institute of Industrial Technology.

2. Description of the Related Art

A robot is a machine that may handle some of the functions of a person or perform a certain task on its own. Recently, industrial robots or medical robots having various functions and complex structures are being developed.

In the existing technique, a robot has been fabricated so that a main body for performing computational processing and the like and a driving unit having a motor and an actuator are integrated. Even if the main body and the driving unit are not integrally fabricated, it is general that the main body and the driving unit are structured securely using a fastening member such as a bolt or a screw so as not to be easily separated structurally.

However, for easier replacement of components of a robot and easier repair of errors, a module-type robot in which the driving unit may be easily mounted to or disassembled from the main body has been commercially available recently. For example, a single finished robot product may be manufactured by combining and assembling a plurality of modules, which are responsible for functions of the main body or functions of the driving unit.

For proper operation of the module-type robot, the modules should ensure both structural coupling and electrical/mechanical coupling for electric lines. Here, the structural coupling means that two components are mechanically combined into a single form, and the electric line coupling means that a power supply line, a communication line and a control line are connected to each other.

In this way, for electrically/mechanically connecting the modules, a connector serving as a connection member between the modules is required between the modules. In other words, depending on the type and function of the connector, the ease of assembling and disassembling of unit modules of a robot or the completeness of the structural or electrical connection of the modules is greatly changed. Therefore, in the field of the module-type robot, the connector is being actively researched.

For example, U.S. Pat. No. 6,605,914 discloses a pivot mechanism for electrically/mechanically connecting modules. Pivot mechanisms are installed separately to adjacent modules, and the pivot mechanisms are coupled so that the modules are united together. The pivot mechanisms disclosed in this document have no distinction between male and female coupling portions, so that the coupling portions may be mutually coupled in a genderless way, and the coupling portions may be coupled to each other at eight initial positions in total.

However, since terminals of the pivot mechanism are arranged in a concentric ring shape, when a bending force is applied to the connecting portion, the electrical connection of the pivot mechanism may become unstable due to the poor contact between the terminals. In addition, since a power source is embedded in the module in a battery form and the number of terminals for transmitting signals between the modules is limited, it is impossible to perfectly implement an electrically genderless configuration.

As another example, U.S. Unexamined Patent Publication US 2013/0340560 discloses a coupling member for making electrical/mechanical connection between modules. The coupling member includes a circular PCB interface for the electrical connection between the modules and a mechanical coupling for the structural connection between the modules.

However, since the coupling members are distinguished from each other by male and female members, the directionality should be considered when the male and female coupling members are coupled and assembled, which seriously deteriorates the ease of assembling and greatly increases the possibility of occurrence of errors. Also, when the coupling members are connected to each other, only two initial coupling positions may be selected at an interval of 180 degrees, which limits the degree of freedom for coupling between the modules.

Moreover, the coupling members of the modules according to the above documents are applicable when the modules have the same size. In other words, a device connected to the module is connected to a product which receives a specific amount of electrical signals. Therefore, the existing module connecting device as described above has a problem in that it is difficult to integrally connect devices having different capacities.

SUMMARY

The present disclosure is directed to providing a module connection system which may electrically/mechanically connect modules having different capacities and sizes efficiently and may be freely configured in a flexible way according to the purpose of a user since the modules may be coupled in a genderless way.

In an aspect of the present disclosure, there is provided a module connection system, which is configured by connecting a plurality of modules by means of connectors, wherein the modules include a base module, a first module and a second module, wherein the connectors include a first connector and a second connector, wherein the base module transmits power and signals provided from a driving source, the first module is electrically/mechanically connected to the base module by means of the first connector, and the second module is electrically/mechanically connected to the first module by means of the second connector, and wherein the first connector includes a larger number of connection terminals in comparison to the second connector in order to transmit power and signals from the base module to the second module and simultaneously supply power and signals required for the first module.

According to an embodiment, the first module may include a first joint module at both ends of which the first connector is formed and a first link module at one end of which the first connector is formed and at the other end of which the second connector is formed, the first connector formed at one end of the first joint module may be connected to the first connector formed at the base module so that the first joint module is electrically/mechanically connected to the base module, the first connector formed at one end of the first link module may be connected to the first connector formed at the other end of the first joint module so that the first link module is electrically/mechanically connected to the first joint module, and the second connector formed at the other end of the first link module may be connected to the second connector formed at the second module so that the first link module is electrically/mechanically connected to the second module.

According to an embodiment, the modules may include a third module, and the connectors include a third connector, the third module may be electrically/mechanically connected to the second module by means of the third connector, and the second connector may include a larger number of connection terminals in comparison to the third connector in order to transmit power and signals from the first module to the third module and simultaneously supply power and signals required for the second module.

According to an embodiment, the second module may include a second joint module at both ends of which the second connector is formed and a second link module at one end of which the second connector is formed and at the other end of which the third connector is formed, the second connector formed at one end of the second joint module may be connected to the second connector formed at the first link module so that the second joint module is electrically/mechanically connected to the first link module, the second connector formed at one end of the second link module may be connected to the second connector formed at the other end of the second joint module so that the second link module is electrically/mechanically connected to the second joint module, and the third connector formed at the other end of the second link module may be connected to the third connector formed at the third module so that the second link module is electrically/mechanically connected to the third module.

According to an embodiment, the first connector and the second connector may include a plurality of power connection terminals and a plurality of signal connection terminals, some of the power connection terminals of the first connector may be electrically connected to the power connection terminals of the second connector through a power connection wire formed at the first module, and some of the signal connection terminals of the first connector may be electrically connected to the signal connection terminals of the second connector through a signal connection wire formed at the first module.

According to an embodiment, first operation device connectors of the same form may be formed at the first module and the second module so that a first operation device performing a predetermined work is connected thereto, and the first operation device connectors respectively formed at the first module and the second module may be electrically connected to each other through the signal connection terminals of the first connector and the second connector to share a driving signal of the first operation device among signals provided from the driving source.

According to an embodiment, the second connector and the third connector may include a plurality of power connection terminals and a plurality of signal connection terminals, some of the power connection terminals of the second connector may be electrically connected to the power connection terminals of the third connector through a power connection wire formed at the second module, and some of the signal connection terminals of the second connector may be electrically connected to the signal connection terminals of the third connector through a signal connection wire formed at the second module.

According to an embodiment, second operation device connectors of the same form may be formed at the first module, the second module and third module so that a second operation device performing a predetermined work is connected thereto, and the second operation device connectors respectively formed at the first module, the second module and the third module may be electrically connected to each other through the signal connection terminals of the first connector, second connector and third connector to share a driving signal of the second operation device among signals provided from the driving source.

According to an embodiment, the first connector and the second connector may have the same structure, except for sizes and the number of terminals thereof.

According to an embodiment, the connectors of the module connection system may have a genderless coupling structure so that connectors disposed to face each other and having the same structure are coupled without the male and female distinction.

According to an embodiment, the connector of the module connection system may include a plurality of terminal units formed with a fan shape at a center of a circular board and disposed along a periphery of the connector, and the terminal units may include a power supply unit having a plurality of power connection terminals sequentially formed from the center of the board toward the outside, a signal transmission unit having a plurality of signal connection terminals, and a plurality of ground terminals.

According to an embodiment, the number of terminals of the connector of the module connection system may be increasing in proportion to the capacity of modules to be connected.

DETAILED DESCRIPTION

Figure 1:
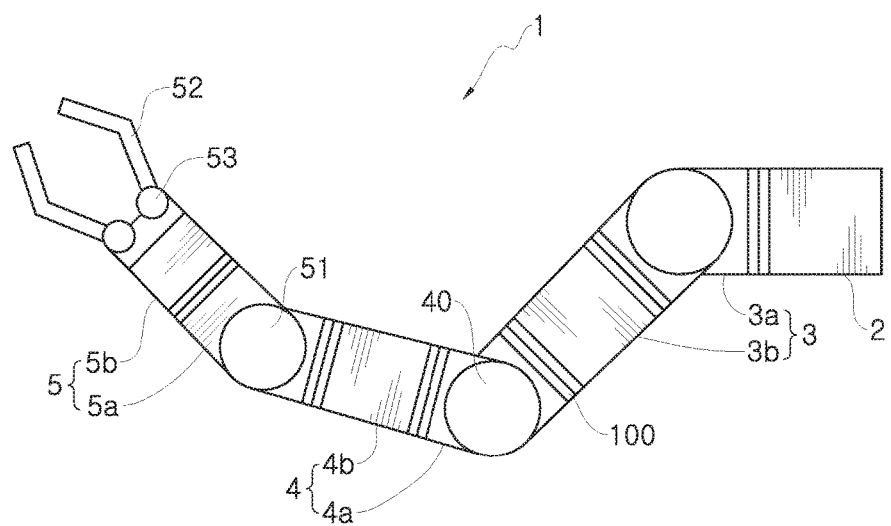
FIG. 1 is a diagram showing a module connection system according to an embodiment of the present disclosure.

Hereinafter, an embodiment of the present disclosure will be described with reference to the drawings. Even though the present disclosure is described based on the embodiment depicted in the drawings, this is just an example, and the essential configuration and operations of the present disclosure are not limited thereto.

FIG. 1 is a diagram showing a module connection system 1 according to an embodiment of the present disclosure.

The module connection system 1 according to this embodiment is a robot arm formed as a cantilever with respect to a base module 2a to perform a predetermined operation.

As shown in FIG. 1, the module connection system 1 includes a first module 3, a second module 4 and a third module 5 connected in series to the base module 2a.

The module connection system 1 receives power and signals required for the module connection system 1 from a driving source 2, and the base module 2a supports the first module 3, the second module 4 and the third module 5 and also transmits the power and signals, supplied from the driving source 2, to all modules 3, 4, 5.

The first module 3 includes a first joint module 3a forming a first joint 30 of a robot arm and having a motor for rotating the first joint 30 and a first link module 3b connected to the first joint module 3a to meet a required length of the robot arm.

The second module 4 includes a second joint module 4a forming a second joint 40 of the robot arm and having a motor for rotating the second joint 40 and a second link module 4b connected to the second joint module 4a to meet a required length of the robot arm.

The third module 5 includes a third joint module 5a forming a third joint 50 of the robot arm and having a motor for rotating the third joint 50 and a third link module 5b connected to the third joint module 5a.

In this specification, for convenience, the "joint module" and the "link module" are described distinguishably, but the present disclosure should be not limited to the case where the joint module is interpreted as a module including a driving device such as a motor and the link module is interpreted a module simply for length connecting.

For example, an end effector such as a robot hand 52 may be formed at an end of the third link module 5b, and a joint 53 and a motor for actuating the robot hand 52 may be formed.

The connectors 100 are connected to the ends of seven modules 2a, 3a, 3b, 3c, 4a, 4b, 5a, 5b employed in the module connection system 1 according to this embodiment, and two connectors 100 facing each other are coupled to give electrical/mechanical connection between the modules.

When a plurality of modules are connected to configure the module connection system 1, electrical capacities such as power and/or signals required for the modules are different from each other.

For example, if the modules of the module connection system 1 are connected in series with respect to the base module 2a as in this embodiment, the first joint module 3a needs to be configured with a large-capacity module having a relatively high capacity because the motor for the first joint module 3a should operate while burdening the weight of the subsequent modules 3b, 4, 5. In other words, the size of the module increases in proportion to the size of the motor, and accordingly, the size and required strength of a mechanism configuring the first module 3 increase together.

Meanwhile, the third link module 5b located at an end may be configured with a small-capacity module having a relatively low capacity since it is enough to operate the end effector just through the motor 53.

If the module connection system is configured using a connector of the existing technique without considering such structural characteristics, power and signals may be wasted unnecessarily, and the size of the connected modules needs to be designed in consideration of the size of the connector, which disturbs free application and combination of the modules.

Accordingly, according to this embodiment, a single system 1 may be efficiently configured using modules having different capacities by applying different connectors depending on the capacity of modules to be connected.

Figure 2:
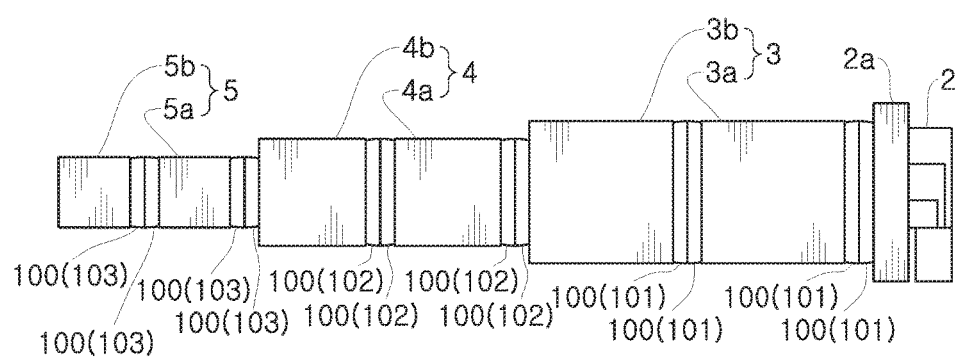
FIG. 2 is a schematic view showing the module connection system of FIG. 1 in a simple way.

FIG. 2 is a schematic view showing the module connection system 1 of FIG. 1 in a simple way.

As shown in FIG. 2, the base module 2a and the first module 3 are a large-capacity module (a large module) having largest size and capacity, the second module 4 is a medium-capacity module (a medium module) having smaller size and capacity compared to the first module 3, and the third module 5 is a small-capacity module (a small module) having smallest size and capacity compared to the second module 4.

The connector 100 according to this embodiment is formed with a connector 101 for a large module, a connector 102 for a medium module, and a connector 103 for a small module, depending on the capacity of modules to be connected.

The connector 101 for a large module is coupled to one end of the first module 3 with large capacity for the connection to the base module 2a, and the connector 102 for a medium module is formed at the other end thereof for the connection with the second module 4. In more detail, the connector 101 for a large module is respectively formed at both ends of the first joint module 3a of the first module 3, and the connector 101 for a large module and the connector 102 for a medium module are respectively formed at both ends of the first link module 3b.

The connector 101 for a large module is formed at the base module 2a, and the connector 101 for a large module formed at one end of the first joint module 3a is connected to the connector 101 for a large module of the base module 2a, thereby electrically/mechanically connecting the base module 2a and the first joint module 3a.

By connecting the connector 101 for a large module of the first link module 3b to the connector 101 for a large module formed at the other end of the first joint module 3a, the first joint module 3a and the first link module 3b are electrically/mechanically connected. By doing so, the base module 2a and the first module 3 are entirely electrically/mechanically connected.

The connector 102 for a medium module is coupled to one end of the second module 4 with a medium capacity for the connection to the first module 3, and the connector 103 for a small module is formed at the other end for the connection to the third module 5. In more detail, the connector 102 for a medium module is respectively formed at both ends of the second joint module 4a of the second module 4, and the connector 102 for a medium module and the connector 103 for a small module are respectively formed at both ends of the second link module 4b.

By connecting the connector 102 for a medium module of the second joint module 4a to the connector 102 for a medium module formed at the other end of the first link module 3b, the second joint module 4a and the first link module 3b are electrically/mechanically connected.

By connecting the connector 102 for a medium module of the second link module 4b to the connector 102 for a medium module formed at the other end of the second joint module 4a, the second joint module 4a and the second link module 4b are electrically/mechanically connected. By doing so, the base module 2a, the first module 3 and the second module 4 are entirely electrically/mechanically connected.

The third module 5 with small capacity is connected to the second module 4 through the connector 103 for a small module. In more detail, the connector 103 for a small module is respectively formed at both ends of the third joint module 5a of the third module 5, and the connector 103 for a small module is formed at one end of the third link module 5b.

By connecting the connector 103 for a small module of the third joint module 5a to the connector 103 for a small module formed at the other end of the second link module 4b, the third joint module 5a and the second link module 4b are electrically/mechanically connected.

By connecting the connector 103 for a small module of the third link module 5b to the connector 103 for a small module formed at the other end of the third joint module 5a, the third joint module 5a and third link module 5b are electrically/mechanically connected. By doing so, the base module 2a, the first module 3, the second module 4 and the third module 5 are entirely electrically/mechanically connected.

According to this embodiment, the connector 101 for a large module, the connector 102 for a medium module and the connector 103 for a small module, which have different capacities, are formed depending on the capacity of the modules to be connected. Accordingly, modules may be electrically/mechanically connected with suitable capacity just by checking the type of connectors connecting connectors of the same type. Therefore, the module connection system 1 of various types may be configured in a very quick and simple way.

In addition, the module connection system 1 may have diverse structures by using an intermediate connection module having connectors with different capacities respectively at both ends thereof, like the first link module 3b.

According to this embodiment, various combinations and easy assembling of the module connection system 1 are further enhanced by forming the connector 100 to allow genderless coupling.

Figure 3:
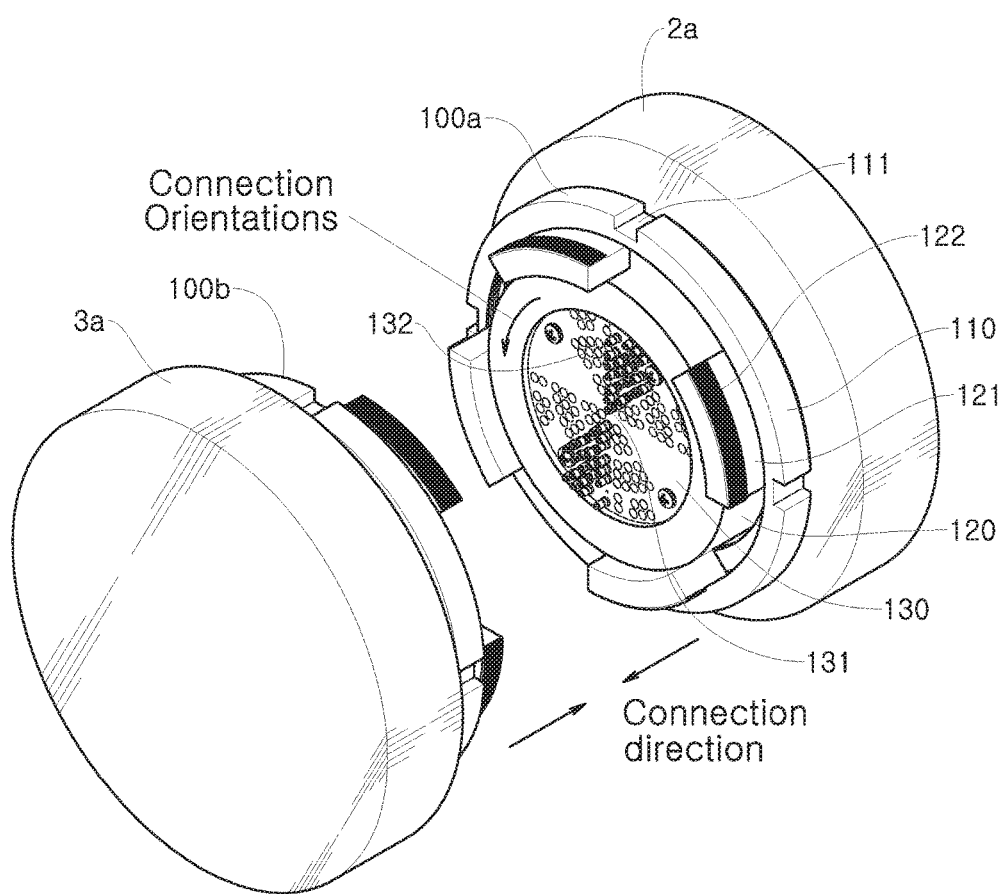
FIG. 3 is a perspective view showing a connector according to an embodiment of the present disclosure.

FIG. 3 is a perspective view showing the connector 100 according to an embodiment of the present disclosure.

In addition, even though FIG. 3 depicts that the connector 100 formed at an end of the base module 2a is represented as a connector 100a and that the connector 100 formed at the first joint module 3a is represented as a connector 100b, both connectors 100a, 100b have the same structure. Hereinafter, it should be understood that, if necessary, the connector 100a and the connector 100b are referred to as the connector 100 without distinguishing them from each other, and in the connection relationship of two connectors, they may be clearly distinguished by adding "a" or "b" after their reference signs.

The connector 101 for a large module, the connector 102 for a medium module and the connector 103 for a small module according to this embodiment are different just in the number of terminals 131, 132 and their sizes (diameters), but their structures are identical to each other. It should be understood that the connector 100 shown in FIG. 3 is not any one of three kinds of connectors, but this is for illustrating the structures of three kinds of connectors.

Referring to FIG. 3, the connector 100 includes a board 130 connected to an adjacent connector to establish an electrical connection. The board 130 may be, for example, a printed circuit board (PCB).

A fixing body 120 and a fixing ring 110 are sequentially disposed at an outer side of the board 130. The fixing body 120 is disposed to surround the board 130, and the fixing ring 110 is disposed to surround the fixing body 120.

The fixing body 120 has four fixing wings 121 formed at an outer surface thereof and having wing threads 122. The fixing wing 121 is formed on the outer surface of the fixing body 120 and disposed between the fixing body 120 and the fixing ring 110.

The fixing wing 121 is formed with a length corresponding to one-eighth of the circumference of the fixing body 120, and four fixing wings 121 are arranged at intervals of 90 degrees in the circumferential direction of the fixing body 120. Accordingly, the fixing wing 121b of the connector 100b connected to adjacent two fixing wings 121a of the connector 100a may be inserted between the two fixing wings 121a.

The fixing wing 121 is partly protruded to the front of the fixing body 120, and the wing thread 122 is formed at the front side of the fixing wing 121 protruding forward.

A ring thread is formed on the inner surface of the fixing ring 110. The ring thread of the fixing ring 110a of a single connector 100a may be engaged with the wing thread 122b of the fixing wing 120b of a connector 100b connected thereto.

The wing threads 122 respectively formed at the fixing wings 121 are physically separated, but the wing threads 122 of four fixing wings 121 form a single spiral path. Therefore, the ring thread formed on the inner surface of the fixing ring 110 of the connector 100a may be simultaneously engaged and screwed to the wing thread 122b of the fixing wing 121b of the connector 100b.

A dent portion 111 having a concave shape in the inward direction is formed at the outer surface of the fixing ring 110. The dent portion 111 serves as a handle for the user to rotate the fixing ring 110 of the connector 100.

Figure 4A:
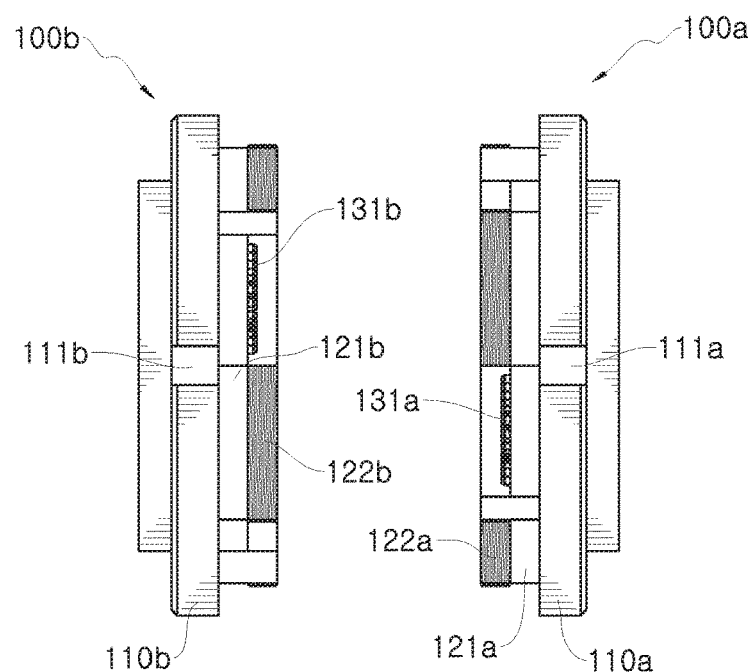
FIGS. 4A to 4C are diagrams showing that the connectors depicted in FIG. 3 are coupled to each other.
Figure 4B:
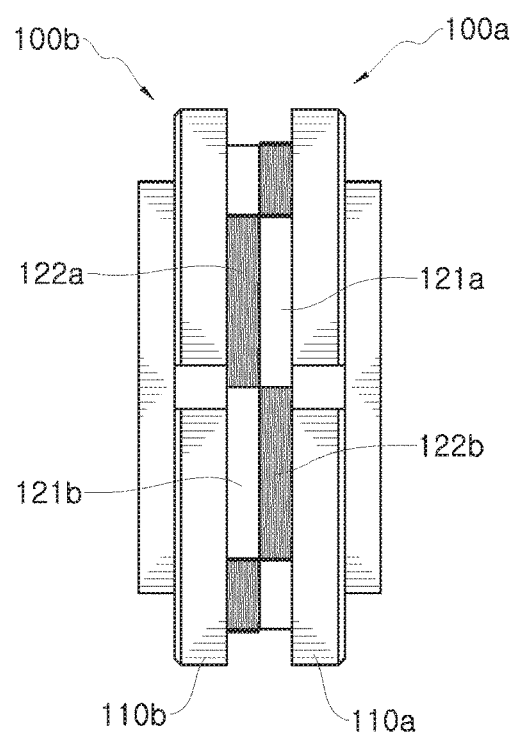
Figure 4C:
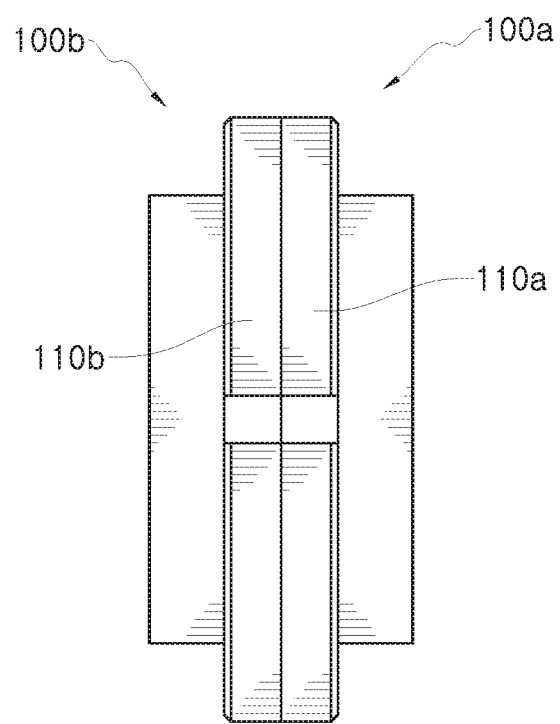

FIGS. 4A to 4C are diagrams showing that two connectors 100a, 100b are coupled to each other.

First, in a separated state as shown in FIG. 4A, the coupling surface of the connector 100a and the coupling surface of the connector 100b are arranged to face each other.

Next, as shown in FIG. 4B, a fixing wing 121b of another connector 100b is inserted between two adjacent fixing wings 121a of one connector 100a.

Next, the fixing ring 110a of the connector 100a is rotated to advance toward the connector 100b, and the ring thread of the fixing ring 100a is rotationally coupled to the wing thread 122b of the connector 100b. Subsequently, the fixing ring 110b of the connector 100b is rotated to advance toward the connector 100a, and the ring thread of the fixing ring 100b is rotationally coupled to the wing thread 122a of the connector 100a.

According to this embodiment, the thickness of the fixing ring 110 is formed to be substantially equal to the width of the wing thread 122 of the fixing wing 120. Also, although not shown in detail, the fixing ring 110 includes a flange extending in an inner diameter direction of the body of a substantial ring shape and biased toward the back side of the body to form a step. When the fixing ring 110 of the connector 100a is screwed to the wing thread 122b of the connector 100b, if the fixing wing 121b of the connector 100b abuts against the flange of the fixing ring 110a of the connector 100a, the fixing ring 110a of the connector 100a does not advance further but stops at a position where it fully covers the wing thread 122b of the connector 100b.

As shown in FIG. 4C, if the fixing ring 110a of the connector 100a completely covers the wing thread 122b of the connector 100b and the fixing ring 110b of the connector 100b completely covers the wing thread 122a of the connector 100a, two connectors 100a, 100b are mechanically connected. At this time, the terminals of two connectors 100a, 100b are brought into contact with each other, so that the electrical connection between the two connectors 100a, 100b is also naturally performed.

Referring to FIG. 3 again, according to this embodiment, two types of terminals 131, 132 are formed at the board 130 of the connector 100. The terminal 131 of a first type is a pin terminal 131 protruding to the front of the board 130, and the terminal 132 of a second type is a pad terminal 132 formed substantially parallel to the board 130.

The pin terminal 131 is a spring pin which is pushed inside the board 130 when pressure is applied thereto, and then protrudes again due to the restoring force of the spring when the pressure is released.

According to this embodiment, the pin terminal 131a of the connector 100a contacts the pad terminal 132b of the facing connector 100b to electrically connect both connectors 100a, 100b.

Figure 5:
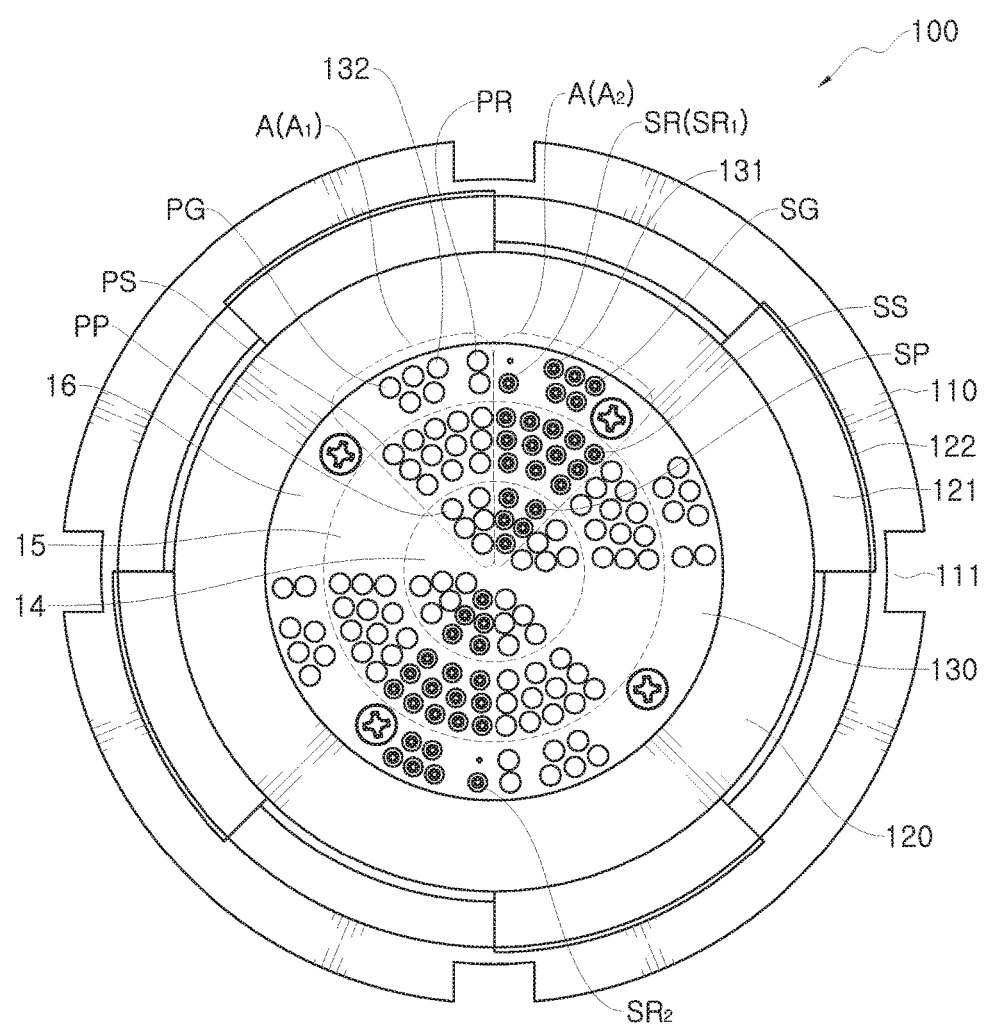
FIG. 5 is a front view showing the connector of FIG. 3.

Hereinafter, referring to FIG. 5, the structure of the board 130 of the connector 100 will be described in more detail. FIG. 5 is a front view of the connector 100.

As shown in FIG. 5, the board 130 includes a terminal unit A in which a plurality of terminals 131, 132 are densely arranged in a fan shape with an angle of 45°.

According to this embodiment, the terminal unit A includes a pad terminal unit $A_1$ formed by a plurality of pad terminals 132 and a pin terminal unit $A_2$ formed by a plurality of pin terminals 131.

According to this embodiment, six terminal units A composed of two pin terminal units $A_2$ symmetric to each other based on the origin and four pad terminal units $A_1$ arranged at both sides of the pin terminal units $A_2$.

The terminal unit A may be distinguished into a power supply unit 14, a signal transmission unit 15 and a ground 16, which are sequentially formed from the center of the board 130 to the outside.

Even though FIG. 5 shows a dotted borderline among the power supply unit 14, the signal transmission unit 15 and the ground 16, it will be understood that this is an imaginary line for distinguishing portions with different functions.

In this embodiment, the pad terminal unit Ai includes five power connection pad terminals PP belonging to the power supply unit 14, twelve signal connection pad terminals PS belonging to the signal transmission unit 15, and five ground pad terminals PG belonging to the ground 16. In addition, the pad terminal unit $A_1$ includes two position checking pad terminals PR in the radial direction of the board 130 at the ground 16.

The pin terminal unit $A_2$ includes five power connection pin terminals SP belonging to the power supply unit 14, twelve signal connection pin terminals SS belonging to the signal transmission unit 15, and five ground pin terminals SG belonging to the ground 16. In addition, the pin terminal unit $A_2$ includes one position checking pin terminal SR at the ground 16.

As shown in FIG. 5, one pin terminal unit $A_2$ includes a first position checking pin terminal $SR_1$ arranged inward in the radial direction of the board, and the other pin terminal unit $A_2$ symmetrical to the first pin terminal unit $A_2$ based on the origin includes a second position checking pin terminal $SR_2$ disposed outwards in the radial direction of the board. The use of the position checking pin terminal and the position checking pad terminal will be described later.

The power connection terminal disposed at the power supply unit 14 is configured to supply a voltage to a module connected by the connector 100, and the signal connection terminal disposed at the signal transmission unit 15 is configured to transmit or receive an electric signal to a module connected by the connector 100. The ground terminal of the ground 16 is configured to keep the device potential at zero.

According to this embodiment, six terminal units A are substantially the same in view of the numbers and positions of power connection terminals (power connection pad terminal, power connection pin terminal), signal connection terminals (signal connection pad terminal, signal connection pin terminal) and ground terminals (ground pad terminal, ground pin terminal), except for the type of pad and pin terminals and the position of the position checking pin terminal at the pin terminal unit.

Moreover, the terminals included in six terminal units A have a common function depending on their positions.

Figure 6:
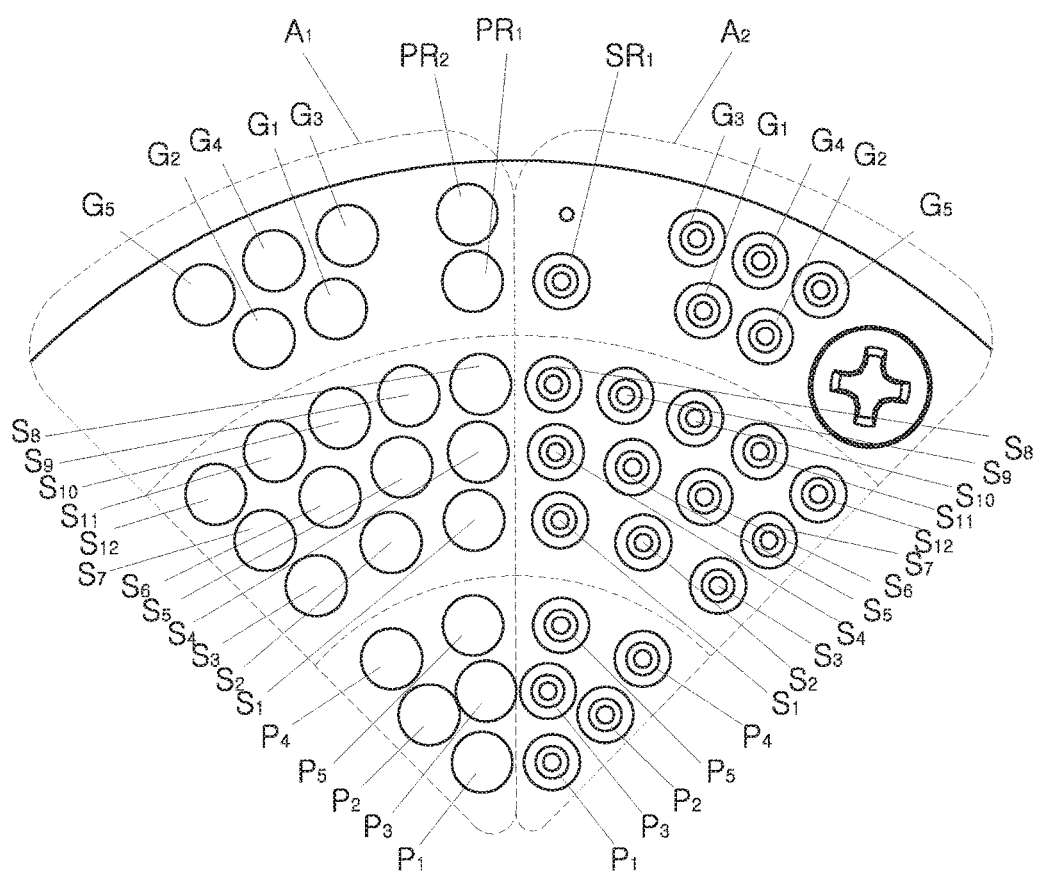
FIG. 6 is an enlarged view showing a portion of a board of the connector depicted in FIG. 5.

FIG. 6 is an enlarged view showing a portion of the board 130 of the connector 100.

In the pad terminal unit $A_1$, five power connection pad terminals PP are electrically connected to five power connection wires $P_1$ to $P_5$ extending into the module to which the connector 100 is connected. In the pad terminal unit $A_1$, twelve signal connection pad terminals PS are electrically connected to twelve signal connection wires $S_1$ to $S_{12}$ extending into the module to which the connector 100 is connected. In the pad terminal unit $A_1$, five ground pad terminals PG are electrically connected to five ground connection wires $G_1$ to $G_5$ extending into the module to which the connector 100 is connected. Although not shown, the pad terminals of other three pad terminal units $A_1$ are also electrically connected to the module in the same way.

Similarly, in the pin terminal unit $A_2$, five power connection pin terminals SP are electrically connected to five power connection wires $P_1$ to $P_5$ extending into the module to which the connector 100 is connected. In the pin terminal unit $A_2$, twelve signal connection pin terminals SS are electrically connected to twelve signal connection wires $S_1$ to $S_{12}$ extending into the module to which the connector 100 is connected. In the pin terminal unit $A_2$, five ground pad terminals SG are electrically connected to five ground connection wires $G_1$ to $G_5$ extending into the module to which the connector 100 is connected. Although not shown, the pin terminals of another pin terminal unit $A_2$ are also electrically connected to the module in the same way.

Since the pin terminal unit $A_2$ of the connector 100a contacts and electrically connects to the pad terminal unit $A_1$ of the connector 100b, it will be understood that the pad terminal unit $A_1$ and the pin terminal unit $A_2$ are connected to the connection wire of the module in a mirror symmetrical structure in a single connector 100.

According to this configuration, each of the power connection wire, the signal connection wire and the ground connection wire extending into the module connected to the connector 100 is diverged into six branches in the vicinity of the connector 100 and electrically connected to terminals respectively formed at of six terminal units A of the connector 100, respectively.

For example, the signal transmitted through the first signal connection wire $S_1$ of the module may be transferred to each terminal unit A and output to six first signal connection terminals.

As described above, the terminals of each terminal group A which are symmetrical based on the origin to each other on the board 130 are electrically connected, so that the amount of signals transmitted between the modules connected through the connector 100 may be increased.

Moreover, the terminals for transmitting the same power or signals are arranged to be symmetrical with respect to each other based on the origin, even if a bending force or the like is applied to two connectors 100a and 100b connected to each other, for example, electric short may be avoided.

Figure 7:
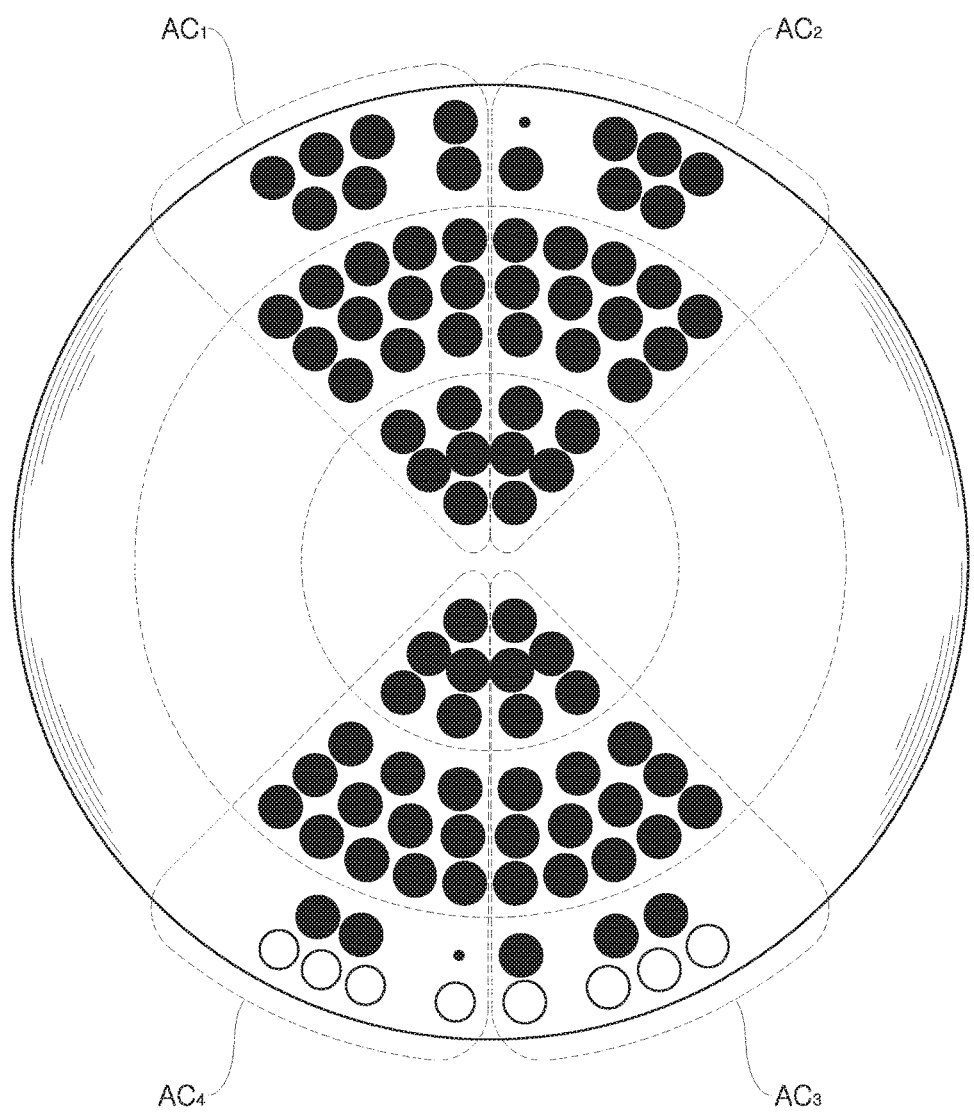
FIG. 7 shows electric connection at boards of two connectors when the connectors of FIG. 3 are connected.

FIG. 7 shows electric connection at the boards between two connectors 100a, 100b.

As described above, since two connectors 100a, 100b are configured such that the fixing wings 121a, 121b disposed at 90 degree interval are inserted into each other, the relative orientation of two connectors 100a, 100b may be 0°, 90°, 180°, or 270°.

According to this embodiment, in the coupling orientation as above, the pin terminal unit $A_2$ of the connector 100a contacts and electrically connects to the pad terminal unit $A_1$ of the connector 100b.

Thus, if the two connectors 100a, 100b are coupled, four terminal units $AC_1$, $AC_2$, $AC_3$, $AC_4$ in total are electrically connected. Accordingly, in a state where the two connectors 100a, 100b are normally coupled, a signal transmitted through one signal connection wire from one module 2a and an electric energy transmitted through one power connection wire are transmitted through four terminals and transmitted to the module 3a connected thereto.

As shown in FIG. 7, it is assumed that a bending stress in the left and right direction on the drawing is applied at the connectors of two connectors 100a, 100b.

Even though a gap between two connectors 100a, 100b is increased to some extent by a bending stress in a normal state, the elasticity of the pin terminal which is a spring pin may maintain electrical connections at all of four terminal units $AC_1$, $AC_2$, $AC_3$, $AC_4$.

However, if the gap between the two connectors 100a, 100b is increased due to the bending stress beyond the allowable limit for operating the pin terminal, some terminals may be electrically disconnected among from the four terminal units $AC_1$, $AC_2$, $AC_3$, $AC_4$.

FIG. 7 shows that three signal connection wires $S_7$, $S_{11}$, $S_{12}$ marked in white color at two terminal units $AC_2$, $AC_3$ are electrically short-circuited (Here, it is extremely rare that the electrical connection of some terminals is cut off due to the bending stress since two connectors are strongly fixed by a fixing unit such as the fixing ring. However, it may happen relatively easily that the terminal is not electrically connected properly due to defects.)

Although three signal connection wires $S_7$, $S_{11}$, $S_{12}$ are electrically disconnected from two terminal units $AC_2$, $AC_3$, due to the symmetrical structure of the connectors, the electric connection of the corresponding signal connection wire $S_7$, $S_{11}$, $S_{12}$ at the other two terminal units $AC_1$, $AC_4$ are maintained. Therefore, the signal connection between two modules connected by the two connectors 100a, 100b may be maintained. The connection is also maintained in the same way not only when a lateral bending force is applied but also when a bending force is applied in any other direction.

The connector 100 may make an electrical/mechanical connection without any additional measure, as long as the connector 100 forms connection orientation of 0°, 90°, 180° or 270° with a connector having the same structure.

However, since the coupling orientation of two modules connected to two connectors is changed depending on the coupling orientation of the two connectors, in order to initialize or specify the position and orientation of each module in the module connection system 1, it is necessary to identify the coupling orientation of two connectors 100 based on a single reference.

As described above, even though two position checking pad terminals $PR_1$, $PR_2$ (see FIG. 6) are commonly formed in the pad terminal unit $A_1$, in two pin terminal units $A_2$, the position checking pin terminals SR are not disposed at portions on the board 130 which are symmetrical to the origin.

In detail, the first position checking pin terminal $SR_1$ located at the first pin terminal unit is disposed relatively at a radially inward side of the ground 16, and the second position checking pin terminal $SR_2$ located at the second pin terminal unit is disposed relatively at a radially outward side of the ground 16.

Thus, the first position checking pin terminal $SR_1$ of the connector 100a is connected to the first checking pad terminal $PR_1$ of the corresponding pad terminal unit of the connector 100b, and the second position checking pin terminal $SR_2$ of the connector 100a is connected to the second checking pad terminal $PR_2$ of the corresponding pad terminal unit of the connector 100b.

At this time, among four pad terminal units $A_1$, only one first checking pad terminal $PR_1$ is electrically connected and only one second checking pad terminal $PR_2$ is electrically connected.

Since the connector 100 has four pad terminal units $A_1$ at 90° to each other, it is possible to detect four positions in total at 90° interval by checking whether the first checking pad terminal $PR_1$ and the second checking pad terminal $PR_2$ of each pad terminal unit $A_1$ are electrically connected.

Since the power and signal exchange efficiency of the connector 100 according to this embodiment is determined by the number of terminals (namely, the number of pad terminals and pin terminals), unlike the signal transmission unit or the ground, the power supply unit 14 is close to the origin, and thus, in order to dispose as many terminals as possible, it should be prevented that the pad terminal 132 and the pin terminal 131 overlap each other.

Figure 8:
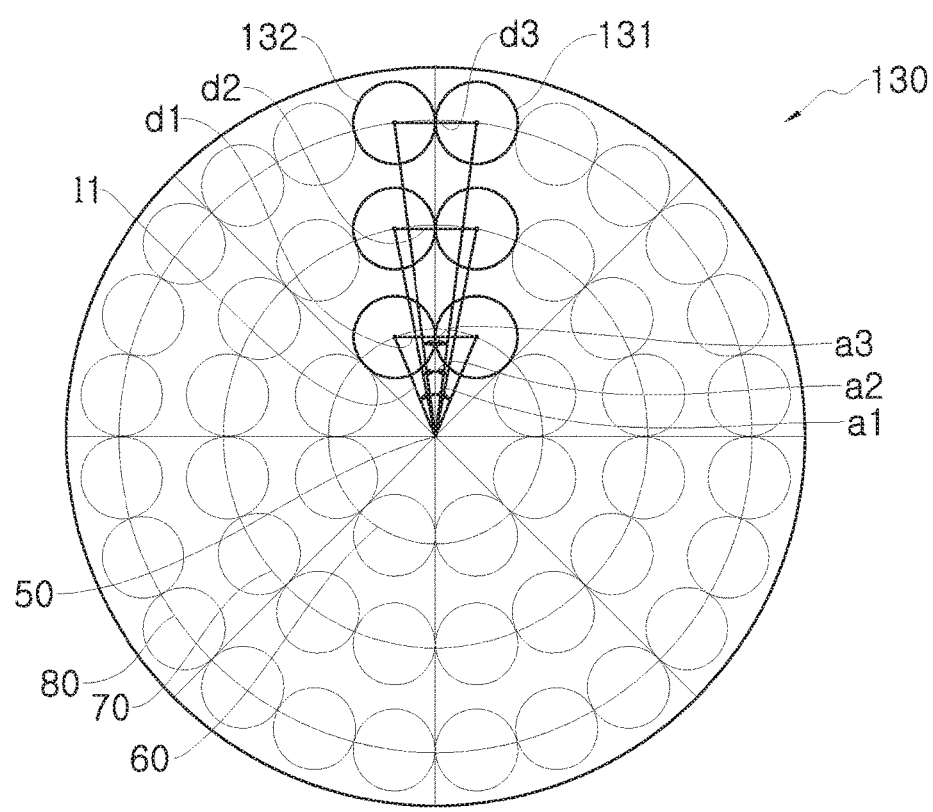
FIGS. 8 and 9 are diagrams for illustrating positioning of a pad terminal and a pin terminal of the connector.
Figure 9:
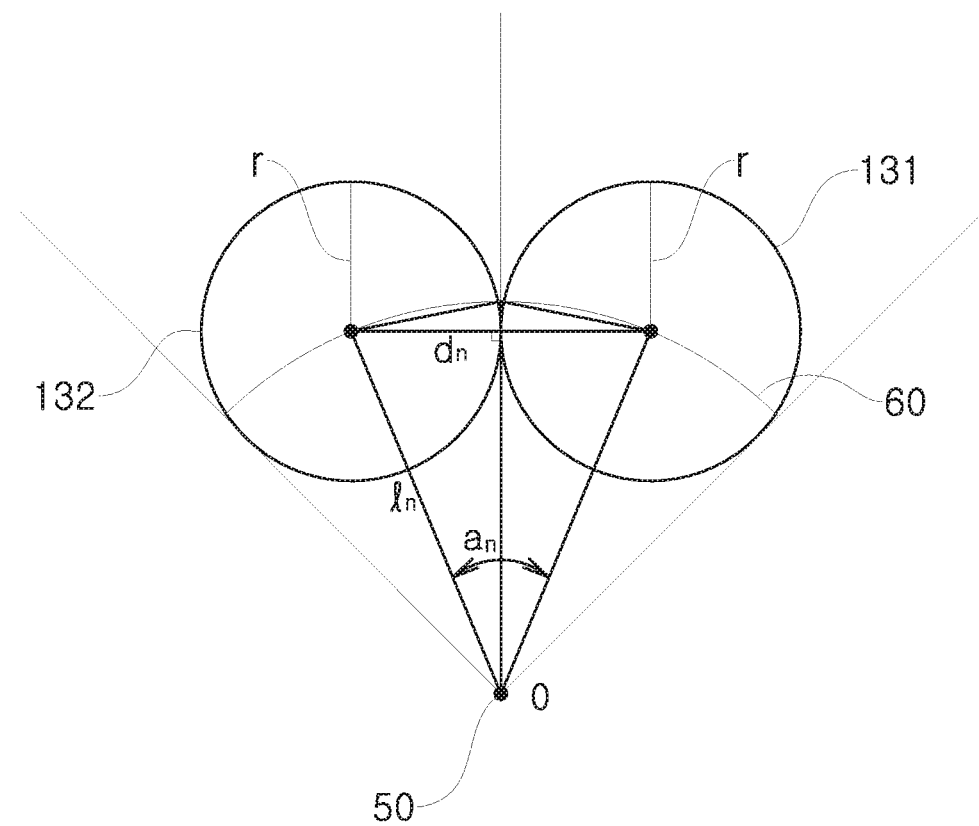

FIGS. 8 and 9 are diagrams for illustrating positioning of the pad terminal 132 and the pin terminal 131.

A minimum distance from the center 50 of the power supply unit to the pad terminal 132 and the pin terminal 131 should be defined in consideration of the size of the pad terminal 132 and the pin terminal 131 provided in a single connector 100 and a distance between them.

In detail, the distance do from the center to the pad terminal 132 and the pin terminal 131 should exceed the sum of the radiuses of the pad terminal 132 and the pin terminal 131.

In this embodiment, the pad terminal 132 and the pin terminal 131 have the same radius (r) value. Therefore, the value of the center distance dn should exceed 2r.

The distance dn between the centers may be calculated by the following equation.

$$dn = 2ln^*\sin(\alpha n/2) \qquad \text{[Equation 1]}$$

In Equation 1 above, ln represents a distance from the center of the pad terminal 132 (or, the center of the pin terminal 131) to the center 50 of the power supply unit 14, and αn represents an angle between an imaginary line connecting the center of the pad terminal 132 and the center 50 of the power supply unit 14 and an imaginary line connecting the center of the pin terminal 131 and the center 50 of the power supply unit 14. In addition, n represents a position of the column to which the terminal belongs.

Here, the r value is a given value. Therefore, a minimum value of ln may be calculated according to the value of αn. In addition, a worker may determine an actual ln value and an actual dn value based on the minimum value of ln. Accordingly, it is possible to dispose pad terminals 132 and pin terminals 131 at the power supply unit 14 as much as possible within a range where the pad terminals 132 and the pin terminals 131 do not overlap with each other.

According to the connector of this embodiment, it has been described that two connectors of the same structure may be coupled in any binding orientation with the relative orientation of 90 degree interval.

Moreover, for example, if the module having the connectors 101 of the same structure at both ends thereof as in the first joint module 3a, the connection direction (see FIG. 3) with the module 2a connected thereto may not put into consideration. For example, it is possible to turn the end towards the first link module 3b into a side towards the base module 2a.

As described above, the module connection system 1 according to this embodiment may be easily modified into various structures by using the connector 100 allowing genderless coupling.

Meanwhile, according to this embodiment, by increasing the number of terminals of the connector in proportion to the capacity of a module to be connected while keeping the structure of the connector 100 substantially, it is possible to vary the number and arrangement of signal lines according to the capacity of the module.

In this embodiment, the kinds of connectors are classified into the connector 101 for a large module, the connector 102 for a medium module and the connector 103 for a small module according to the number of terminals. The larger the capacity of the module, the larger the diameter of the connector, and the increased capacity of the terminal to be connected is coped with by additionally forming terminals in the space ensured due to the increased diameter.

Figure 10:
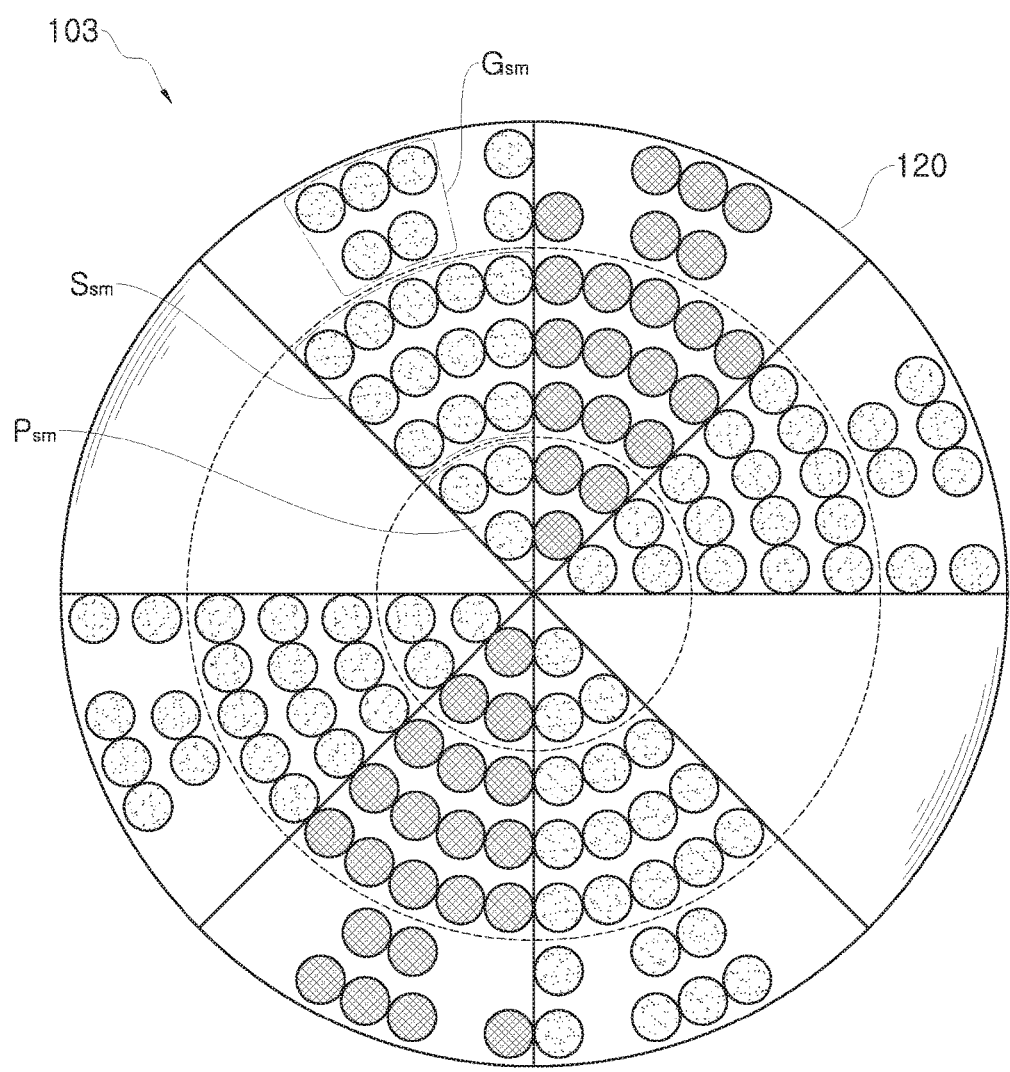
FIG. 10 shows a board of a connector for a small module according to an embodiment of the present disclosure.

FIG. 10 shows a board 120 of a connector 103 for a small module according to an embodiment of the present disclosure.

One terminal unit A of the connector 103 for a small module includes a small power terminal group $P_{sm}$ having three power connection terminals, a small signal terminal group $S_{sm}$ having 12 signal connection terminals and a small ground terminal group $G_{sm}$ having five ground terminals.

Figure 11:
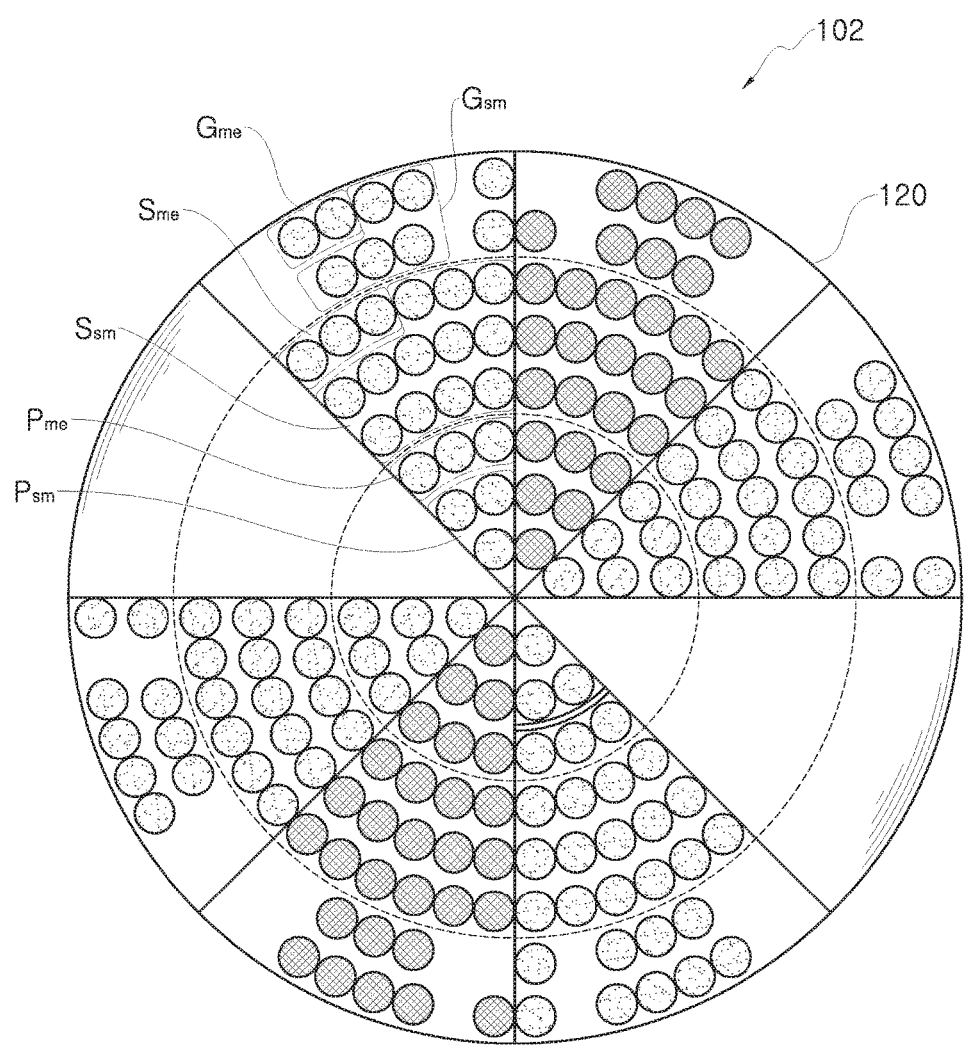
FIG. 11 shows a board of a connector for a medium module according to an embodiment of the present disclosure.

FIG. 11 shows a board 120 of a connector 102 for a medium module according to an embodiment of the present disclosure.

The board 120 of the connector 102 for a medium module has a larger diameter than the board 120 of the connector 103 for a small module and thus includes six power connection terminals, fifteen signal connection terminals and seven ground terminals in a single terminal unit A by using a sufficient space in comparison to the connector 103 for a small module.

Among six power connection terminals of the connector 102 for a medium module, three power connection terminals form a small power terminal group $P_{sm}$ electrically connected to the terminals of the small power terminal group of the connector 103 for a small module, and the other three power connection terminals form a medium power terminal group $P_{me}$ to provide additional power required for the connector 102 for a medium module to the small power terminal group.

Among fifteen signal connection terminals of the connector 102 for a medium module, twelve signal connection terminals form a small signal terminal group $S_{sm}$ electrically connected to the terminals of the small signal terminal group of the connector 103 for a small module, and the other three signal connection terminals form a medium signal terminal group $S_{me}$ for transmitting or receiving signals to/from an operation device dedicated to the connector 102 for a medium module.

Among seven ground terminals of the connector 102 for a medium module, five ground terminals form a small ground terminal group $G_{sm}$ electrically connected to the ground terminals of the small ground terminal group of the connector 103 for a small module, and the other two ground terminals form a medium ground terminal group $G_{me}$ for grounding a component added to the connector 102 for a medium module.

Figure 12:
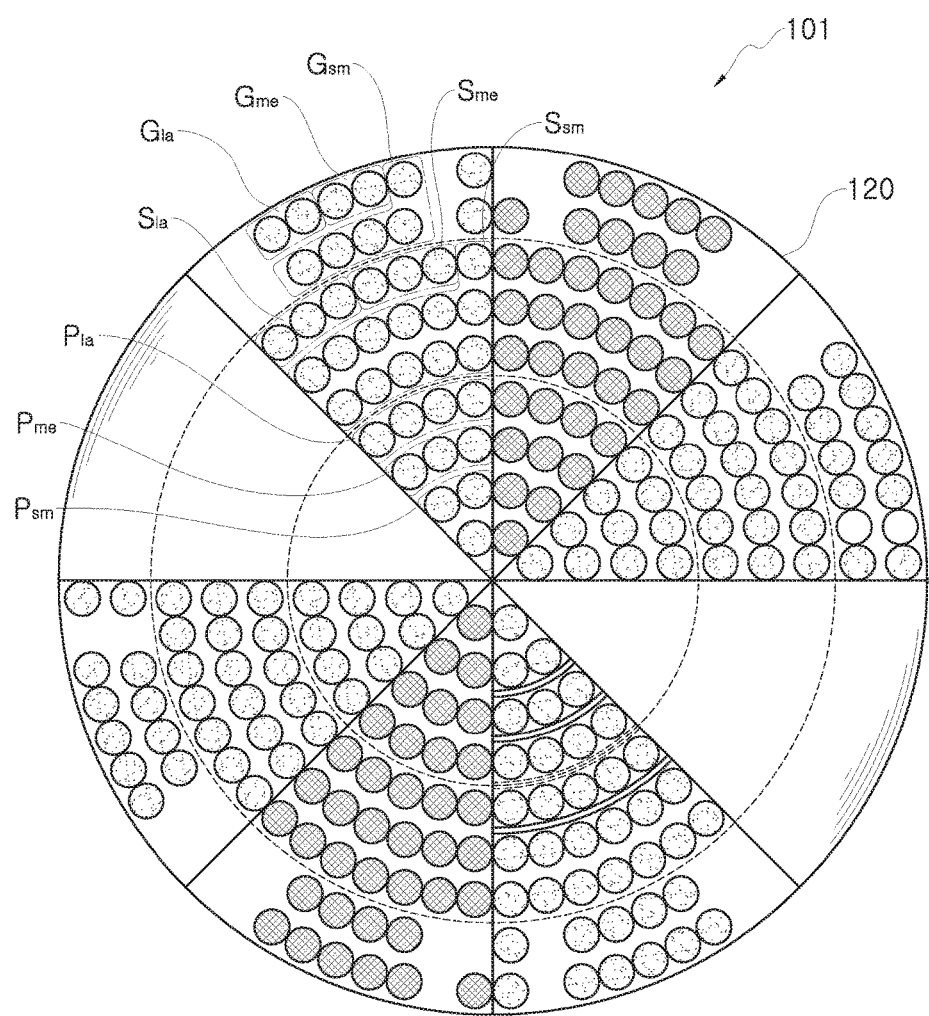
FIG. 12 shows a board of a connector for a large module according to an embodiment of the present disclosure.

FIG. 12 shows a board 120 of a connector 101 for a large module according to an embodiment of the present disclosure.

The board 120 of the connector 101 for a large module has a larger diameter than the board 120 of the connector 102 for a medium module and thus includes ten power connection terminals, eighteen signal connection terminals and nine ground terminals in total in a single terminal unit A by using a sufficient space in comparison to the connector 102 for a medium module.

Among ten power connection terminals of the connector 101 for a large module, three power connection terminals form a small power terminal group $P_{sm}$ electrically connected to the terminals of the small power terminal group of the connector 103 for a small module, three power connection terminals form a medium power terminal group $P_{me}$ electrically connected to the terminals of the medium power terminal group of the connector 102 for a medium module, and the other four power connection terminals form a large power terminal group $P_{la}$ for additionally providing power required for the connector 101 for a large module.

Among eighteen signal connection terminals of the connector 101 for a large module, twelve signal connection terminals form a small signal terminal group $S_{sm}$ electrically connected to the terminals of the small signal terminal group of the connector 103 for a small module, three signal connection terminals form a medium signal terminal group $S_{me}$ electrically connected to the terminals of the medium signal terminal group of the connector 102 for a medium module, and the other three signal connection terminals form a large signal terminal group $S_{la}$ for transmitting or receiving signals to/from an operation device dedicated to the connector 101 for a large module.

Among nine ground terminals of the connector 101 for a large module, five ground terminals form a small ground terminal group $G_{sm}$ electrically connected to the terminals of the small ground terminal group of the connector 103 for a small module, two ground terminals form a medium ground terminal group $G_{sm}$ electrically connected to the terminals of the medium ground terminal group of the connector 102 for a medium module, and the other two ground terminals form a large ground terminal group $G_{la}$ for grounding a component added to the connector 101 for a large module.

If the connector 101 for a large module, the connector 102 for a medium module and the connector 103 for a small module configured as above are sequentially disposed at the module connection system 1, the user may appropriately utilize the connection lines disposed at each module while configuring the module connection system 1.

Figure 13:
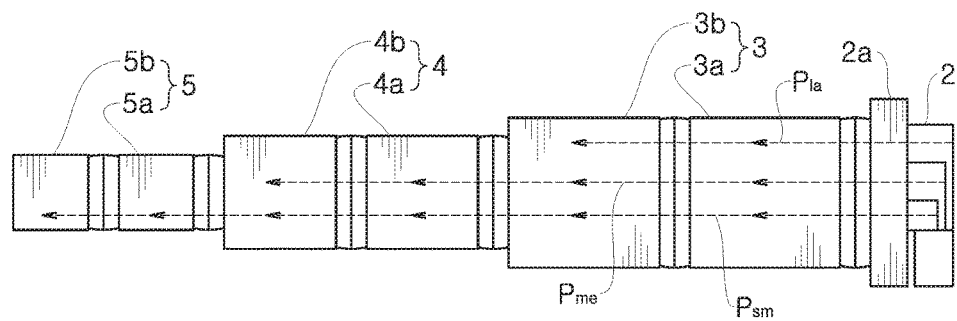
FIG. 13 is a diagram for illustrating power connection of the module connection system of FIG. 2.

FIG. 13 is a diagram for illustrating power connection of the module connection system 1 according to this embodiment.

As shown in FIG. 13, power connection wires electrically connected to the small power terminal groups $P_{me}$ of the connector 101 for a large module, the connector 102 for a medium module and the connector 103 for a small module are formed at the base module 2a, the first module 3, the second module 4 and the third module 5.

In addition, power connection wires electrically connected to the medium power terminal groups $P_{me}$ of the connector 101 for a large module and the connector 102 for a medium module are formed at the base module 2a, the first module 3 and the second module 4.

In addition, power connection wires electrically connected to the large power terminal group $P_{me}$ of the connector 101 for a large module are formed at the base module 2a and the first module 3.

The driving source 2 supplies power to the module connection system 1 through the base module 2a.

Among the power supplied from the driving source 2, sufficient power required for the third module 5 is transmitted to the third module 5 via the first module 3 and the second module 4 by means of electrical connection passing through the small power terminal group $P_{sm}$. The third module 5 may drive the motor and various operation devices connected to the third module 5 by using the power transmitted through the small power terminal group $P_{sm}$.

Among the power supplied from the driving source 2, additional power required for the second module 4 of a medium capacity is transmitted to the second module 4 via the first module 3 by means of electrical connection passing through the medium power terminal group $P_{me}$, in addition to the power supplied through the small power terminal group $P_{sm}$.

The second module 4 may drive the motor and various operation devices connected to the second module 4 by using the power delivered through the small power terminal group $P_{sm}$ and the medium power terminal group $P_{me}$.

Among the power supplied from the driving source 2, additional power required for the first module 3 with large capacity is supplied to the first module 3 by means of electrical connection through the large power terminal group $P_{la}$, in addition to the power supplied through the small power terminal group $P_{sm}$ and the medium power terminal group $P_{me}$.

The first module 3 may drive the motor and various operation devices connected to the first module 3 by using all the power transmitted through the small power terminal group $P_{sm}$, the medium power terminal group $P_{me}$ and the large power terminal group $P_{la}$.

The signal connection of the module connection system 1 according to this embodiment 1 is also similar to the power connection.

Figure 14:
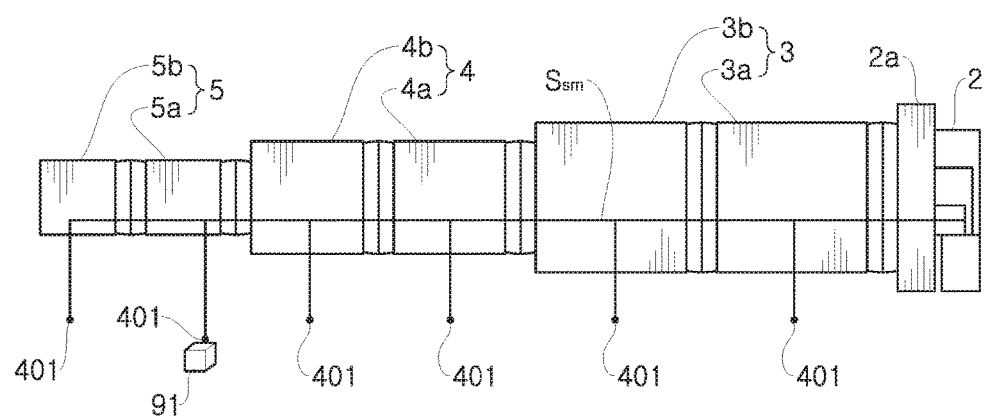
FIGS. 14 to 16 are diagrams for illustrating signal connection of the module connection system of FIG. 2.
Figure 15:
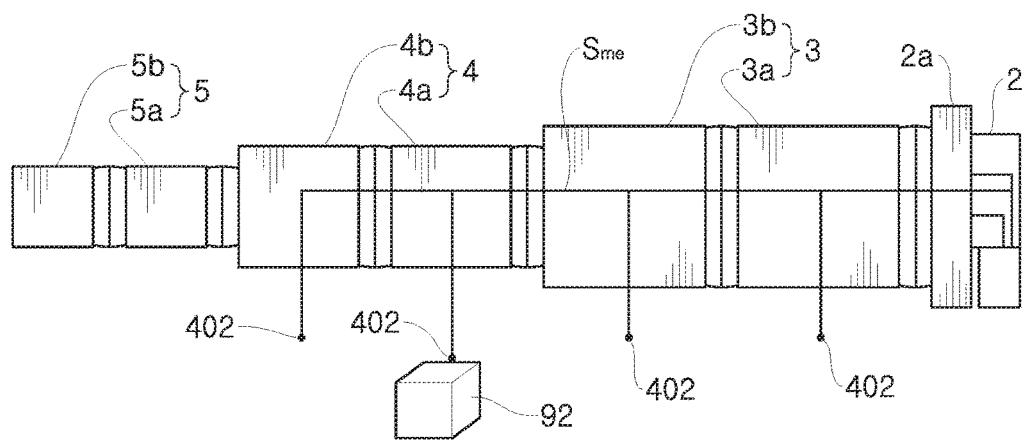
Figure 16:
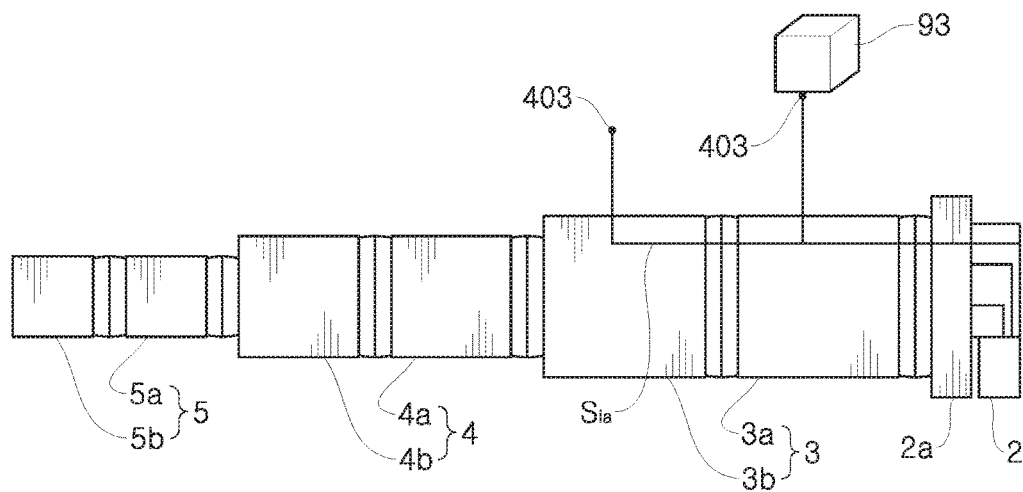

FIGS. 14 to 16 are diagrams for illustrating signal connection of the module connection system 1 according to this embodiment.

As shown in FIG. 14, the driving source 2 provides a third module driving signal required for the third module 5.

Third module signal connection wires electrically connected to the small signal terminal groups $S_{sm}$ of the connector 101 for a large module, the connector 102 for a medium module and the connector 103 for a small module are formed at the base module 2a, the first module 3, the second module 4 and the third module 5. The third module driving signal is transmitted to the third module 5 through the third module signal connection wire.

For example, an operation device ("a first operation device") 91 performing a predetermined work, such as an IMU sensor for sensing a position of the end of a robot arm is connected to the third module which forms the end of the robot arm.

The first operation device 91 may be connected to the module connection system 1 via, for example, a first operation device connector 401 formed at the outer side of the third joint module 5a.

The first operation device connector 401 is electrically connected to the third module signal connection wire passing through the third joint module 5a, and the first operation device 91 operates by receiving a part of the third module driving signal of the driving source 2 transmitted through the small signal terminal group $S_{sm}$.

However, on occasions, the first operation device such as an IMU sensor may need to be attached to any module of the module connection system 1.

As described above, according to this embodiment, due to the characteristics of the connectors which share the small signal terminal group $S_{sm}$, the third module driving signal passes through all modules by means of the third module signal connection wire electrically connected to the small signal terminal group $S_{sm}$.

According to this embodiment, as shown in FIG. 14, the first operation device connector 401 for outputting a driving signal of the first operation device 91 is formed at all modules of the module connection system 1. Accordingly, the first operation device 91 may be connected to various locations of the module connection system 1 depending on the type or the like of the module connection system 1.

Similarly, as shown in FIG. 15, the driving source 2 provides a second module driving signal required for the second module 4.

Second module signal connection wires electrically connected to the medium signal terminal groups $S_{me}$ of the connector 101 for a large module and the connector 102 for a medium module are formed at the base module 2a, the first module 3 and the second module 4. The second module driving signal is transmitted to the second module 4 through the second module signal connection wire.

For example, another operation device ("a second operation device") 92 perform a predetermined work, such as a camera device for checking a working state may be connected to the second module which forms an intermediate position of the robot arm.

The second operation device 92 may be connected to the module connection system 1 via, for example, a second operation device connector 402 formed at the outer side of the second joint module 4a.

The second operation device connector 402 is electrically connected to the second module signal connection wire passing through the second joint module 4a, and the second operation device 92 operates by receiving a part of the second module driving signal of the driving source 2 transmitted through the medium signal terminal group $S_{me}$.

However, similarly, the second operation device may need to be attached to any module of the module connection system 1.

According to this embodiment, due to the characteristics of the connector for a large module and the connector for a medium module which share the medium signal terminal group $S_{sm}$, the second module driving signal passes through the base module 2a, the first module 3 and the second module 4 by means of the second module signal connection wire electrically connected to the medium signal terminal group $S_{me}$.

As shown in FIG. 15, a second operation device connector 402 for outputting a driving signal of the second operation device 92 may be formed at all modules of the module connection system 1, except for the third module 5.

As shown in FIG. 16, the driving source 2 provides a first module driving signal required for the first module 3.

First module signal connection wires electrically connected to the large signal terminal group $S_{la}$ of the connector 101 for a large module are formed at the base module 2a and the first module 3. The first module driving signal is transmitted to the first module 3 through the first module signal connection wire.

For example, another operation device ("a third operation device") 93 performing a predetermined work, such as a motion instruction switch for instructing an operation of the robot arm may be connected to the first module located at the base of the robot arm.

The third operation device 93 may be connected to the module connection system 1 via, for example, a third operation device connector 403 formed at the outer side of the first joint module 3a.

The third operation device connector 403 is electrically connected to the third module signal connection wire passing through the first joint module 3a, and the third operation device 93 operates by receiving a part of the first module driving signal of the driving source 2 transmitted through the large signal terminal group $S_{la}$.

According to this embodiment, due to the characteristics of the connector for a large module which shares the large signal terminal group $S_{la}$, the first module driving signal is transmitted to the first module 3 through the base module 2a by means of the first module signal connection wire electrically connected to the large signal terminal group $S_{la}$.

As shown in FIG. 16, the third operation device connector 403 for outputting the driving signal of the third operation device 93 may be formed at the first joint module 3a and/or the first link module 3b of the first module 3.

As described above, according to the embodiment of the present disclosure, an electric signal may be transmitted to a plurality of devices with different capacities in a single module connection system, suitable for the capacities, and thus it is possible to freely combine and use the module connection system according to the purpose of the user.

What is claimed is:

1. A module connection system, which is configured by connecting a plurality of modules by means of connectors, comprising:
   modules including a base module, a first module and a second module; and
   connectors including a plurality of first connectors and a plurality of second connectors,
   wherein each of the connectors has a genderless coupling structure so that connectors disposed to face each other and having a same structure are coupled without male and female distinction,
   wherein the base module transmits power and signals provided from a driving source, the first module is electrically/mechanically connected to the base module by means of a pair of first connectors among the plurality of first connectors, and the second module is electrically/mechanically connected to the first module by means of a pair of second connectors among the plurality of second connectors, and
   wherein each of the plurality of first connectors includes a larger number of connection terminals in comparison to each of the plurality of second connectors in order to transmit power and signals through connection wires of the base module, the first module and the second module from the base module to the second module and simultaneously supply power and signals required for the first module.

2. The module connection system according to claim 1, wherein the first module includes a first joint module at each of both ends of which a first connector among the plurality of first connectors is formed and a first link module at one end of which a first connector among the plurality of first connectors is formed and at an opposite end of which a second connector of the pair of second connectors is formed,
   wherein the first connector formed at one end of the first joint module, which is one of the pair of first connectors, is connected to a first connector formed at the base module, which is another of the pair of first connectors, so that the first joint module is electrically/mechanically connected to the base module,
   wherein the first connector formed at the one end of the first link module is connected to the first connector formed at an opposite end of the first joint module so that the first link module is electrically/mechanically connected to the first joint module, and
   wherein the second connector formed at the opposite end of the first link module is connected to a second connector formed at the second module, which is another of the pair of second connectors, so that the first link module is electrically/mechanically connected to the second module.

3. The module connection system according to claim 2, wherein the modules further include a third module, and the connectors further include a plurality of third connectors,
   wherein the third module is electrically/mechanically connected to the second module by means of a pair of third connectors among the plurality of third connectors, and
   wherein each of the plurality of second connectors includes a larger number of connection terminals in comparison to each of the plurality of third connectors in order to transmit power and signals through the connection wires of the first module and the second module and connection wires of the third module from the first module to the third module and simultaneously supply power and signals required for the second module.

4. The module connection system according to claim 3, wherein the second module includes a second joint module at each of both ends of which a second connector among the plurality of second connectors is formed and a second link module at one end of which a second connector among the plurality of second connectors is formed and at an opposite end of which a third connector of the pair of third connectors is formed,
   wherein the second connector formed at one end of the second joint module, which is the second connector formed at the second module, is connected to the second connector formed at the first link module so that the second joint module is electrically/mechanically connected to the first link module, wherein the second connector formed at the one end of the second link module is connected to the second connector formed at an opposite end of the second joint module so that the second link module is electrically/mechanically connected to the second joint module, and wherein the third connector formed at the opposite end of the second link module is connected to a third connector formed at the third module, which is another of the pair of third connectors, so that the second link module is electrically/mechanically connected to the third module.

5. The module connection system according to claim 1, wherein each of the plurality of first connectors and each of the plurality of second connectors include a plurality of power connection terminals and a plurality of signal connection terminals, wherein some of the power connection terminals of the first connector are electrically connected to the power connection terminals of the second connector through at least one power connection wire formed at the first module, and wherein some of the signal connection terminals of the first connector are electrically connected to the signal connection terminals of the second connector through at least signal connection wire formed at the first module.

6. The module connection system according to claim 5, further comprising first operation device connectors formed at the first module and the second module so that a first operation device performing a predetermined work is connected to one of the first operation device connectors, wherein the first operation device connectors formed at the first module and the second module respectively are electrically connected to each other through the signal connection terminals of the first connector and the second connector to share a driving signal of the first operation device among signals provided from the driving source.

7. The module connection system according to claim 3, wherein each of the plurality of second connectors and each of the plurality of third connectors include a plurality of power connection terminals and a plurality of signal connection terminals, wherein some of the power connection terminals of the second connector are electrically connected to the power connection terminals of the third connector through at least one power connection wire formed at the second module, and wherein some of the signal connection terminals of the second connector are electrically connected to the signal connection terminals of the third connector through at least one signal connection wire formed at the second module.

8. The module connection system according to claim 7, further comprising
second operation device connectors formed at the first module, the second module and third module so that a second operation device performing a predetermined work is connected to one of the second operation device connectors, wherein the second operation device connectors formed at the first module, the second module and the third module respectively are electrically connected to each other through the signal connection terminals of the first connector, second connector and third connector to share a driving signal of the second operation device among signals provided from the driving source.

9. The module connection system according to claim 1, wherein the first connector and the second connector have the same structure, except for sizes and the number of terminals thereof.

10. The module connection system according to claim 1, wherein the connector of the module connection system includes a plurality of terminal units formed with a fan shape at a center of a circular board and disposed along a periphery of the connector, and wherein the terminal units include a power supply unit having a plurality of power connection terminals sequentially formed from the center of the board toward the outside, a signal transmission unit having a plurality of signal connection terminals, and a plurality of ground terminals.

11. The module connection system according to claim 1, wherein the number of terminals of the connector of the module connection system is increasing in proportion to the capacity of modules to be connected.

* * * * *